Jan. 4, 1927.  
L. J. SAUER ET AL  
BALL BEARING  
Filed Sept. 5, 1924
1,613,058
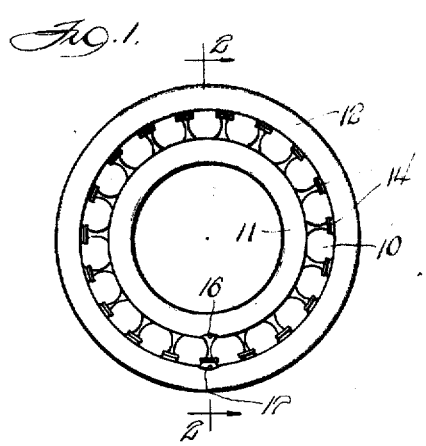
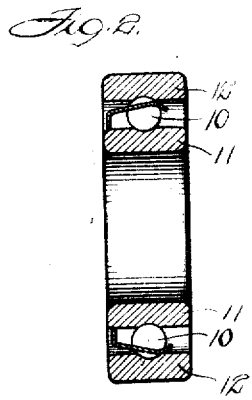
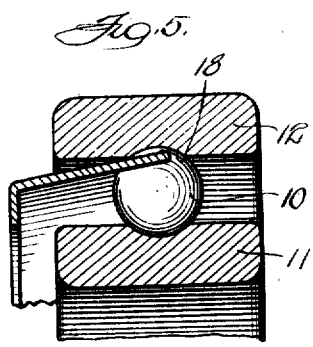
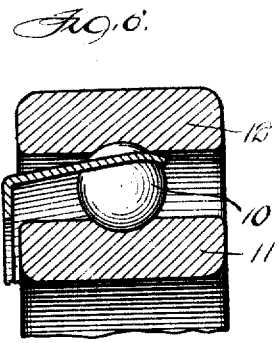
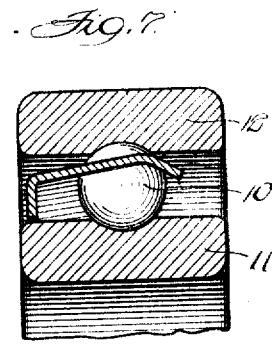
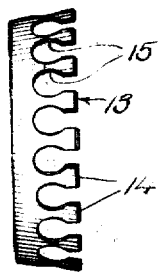
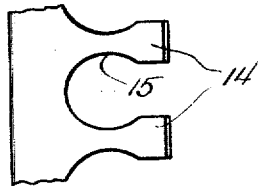

Patented Jan. 4, 1927.

1,613,058

UNITED STATES PATENT OFFICE.

LOUIS J. SAUER, OF OAK PARK, AND CHARLES H. JOY, JR., OF CHICAGO, ILLINOIS, ASSIGNORS TO CHARLES H. JOY, JR., OF CHICAGO, ILLINOIS.

BALL BEARING.

Application filed September 5, 1924. Serial No. 735,892.

Our invention relates to ball bearings.

One of the objects of our invention is to provide an improved one-piece ball retainer.

A further object of our invention is to provide an improved ball retainer which can be forced into position after the balls have been placed in the ball races.

A further object of our invention is to provide a ball retainer which permits of the balls being placed close together to enable practically a full set of balls to be used.

A further object of our invention is to provide a ball bearing construction which will be simple, durable and efficient.

Further objects will appear from the description and claims.

In the drawings, in which our invention is illustrated,

Figure 1 is a side view of a radial ball bearing;

Fig. 2 is a section on the line 2—2 of Fig. 1;

Fig. 3 is an edge view of the ball retainer;

Fig. 4 is an enlarged fragmentary view of the ball retainer fingers;

Figs. 5, 6 and 7 are views showing different steps in the insertion of the ball retainer member.

Referring to the drawings in detail, the radial ball bearing shown therein comprises a set of balls 10, inner and outer ball race members 11 and 12 and a ball retainer 13 for holding the balls in position and in proper spaced relation. The balls and ball race members may be of any usual or suitable construction, the principal novelty being in the ball retaining member and the manner in which it is combined with the other elements.

This ball retaining member may be formed from a single integral piece of material formed into a cup-shape and with the sides of the cup punched out to form flexible fingers 14, the curved edges of which fit over and embrace the balls in the ball race to position them and hold them in their proper relative position. As shown in Fig. 4, the opening 15 between two of these flexible fingers is oval rather than circular. The reason for making the opening oval is to make the edges of the opening conform more closely to the surface of the ball. As shown in Fig. 7, the finger is bent at that portion adjacent the ball so that a round opening between the fingers would not fit the ball closely whereas the oval opening does.

The balls are placed in position in any usual or suitable manner as by positioning the ball race member eccentrically with respect to each other and inserting all but a few of the balls, then positioning the ball or race member concentrically and inserting the last few of the balls by bringing the grooves 16 and 17 in the ball race member opposite each other and inserting the balls through the widened opening thus obtained.

Figs. 5, 6 and 7 show how the ball retainer is inserted into place. Fig. 5 shows the first step. When the ball retainer is pressed to the right, as shown in Fig. 5, the tips of the fingers will be forced outwardly by their engagement with the ball and will extend over into the ball race or groove 18 in the outer member. As the ball retainer is forced further in, as shown in Fig. 6, the tip of the finger slides along the curved surface of the ball race and is guided back into the opening between the two ball race members. Fig. 7 shows the ball retainer in final position with the tip of the ball retainer fingers bent over slightly to better engage and hold the balls in position.

It will be seen that we have provided a simple, one-piece ball retainer which can be forced into position after the ball race members have been assembled and which takes up very little room, enabling the balls to be almost touching each other so that practically a full set of balls may be used.

We claim:

1. A radial ball bearing construction comprising a plurality of balls, inner and outer ball race members and an annular ball retainer having a series of fingers separating the balls, each finger having a curved edge portion conforming to one of the balls, and engaging the ball on the side farthest from the axis of the bearing, the fingers of said retainer being insertable between the balls after the balls have been placed in position between the ball race members, the tip of each finger being of such width that its engagement with the two balls on each side of it forces it outwardly into the race-way in the outer ball race member as the ball retainer is being pressed into place, the engagement of the tip of the finger with the race-way forcing it inwardly again as the retainer is finally pressed into place, the tips of said fingers being wider than the middle portions thereof, the middle portions of said fingers being spaced a substantial distance from the outer ball race member.

2. A radial ball bearing construction comprising a plurality of balls, inner and outer ball race members and an annular ball retainer having a series of fingers separating the balls, each finger having a curved edge portion conforming to one of the balls, and engaging the ball on the side farthest from the axis of the bearing, the fingers of said retainer being insertable between the balls after the balls have been placed in position between the ball race member, the tip of each finger being of such width that its engagement with the two balls on each side of it forces it outwardly into the race-way, in the outer ball race member as the ball retainer is being pressed into place, the engagement of the tip of the finger with the race-way forcing it inwardly again as the retainer is finally pressed into place, the tips of said fingers being wider than the middle portions thereof, the middle portions of said fingers being spaced a substantial distance from the outer ball race member, the tips of said fingers being nearer the axis of said bearing than the middle portions thereof.

In witness whereof, we have hereunto subscribed our names.

LOUIS J. SAUER.
CHARLES H. JOY, Jr.

fingers being spaced a substantial distance from the outer ball race member.

2. A radial ball bearing construction comprising a plurality of balls, inner and outer ball race members and an annular ball retainer having a series of fingers separating the balls, each finger having a curved edge portion conforming to one of the balls, and engaging the ball on the side farthest from the axis of the bearing, the fingers of said retainer being insertable between the balls after the balls have been placed in position between the ball race member, the tip of each finger being of such width that its engagement with the two balls on each side of it forces it outwardly into the race-way, in the outer ball race member as the ball retainer is being pressed into place, the engagement of the tip of the finger with the race-way forcing it inwardly again as the retainer is finally pressed into place, the tips of said fingers being wider than the middle portions thereof, the middle portions of said fingers being spaced a substantial distance from the outer ball race member, the tips of said fingers being nearer the axis of said bearing than the middle portions thereof.

In witness whereof, we have hereunto subscribed our names.

LOUIS J. SAUER.
CHARLES H. JOY, Jr.

CERTIFICATE OF CORRECTION.

Patent No. 1,613,058.            granted January 4, 1927.

to LOUIS J. SAUER ET AL.

It is hereby certified that the assignee in the above mentioned patent was erroneously described and specified as Charles H. Joy, Jr., whereas said assignee should have been described and specified as Charles H. Joy, Sr., of Chicago, Illinois, as shown by the records of assignments in this office; and that the said Letters Patent should be read with this correction therein that the same may conform to the record of the case in the Patent Office.

Signed and sealed this 22nd day of February, A. D. 1927.

M. J. Moore,
Acting Commissioner of Patents.

Seal.

CERTIFICATE OF CORRECTION.

Patent No. 1,613,058, granted January 4, 1927.

to LOUIS J. SAUER ET AL.

It is hereby certified that the assignee in the above mentioned patent was erroneously described and specified as Charles H. Joy, Jr., whereas said assignee should have been described and specified as Charles H. Joy, Sr., of Chicago, Illinois, as shown by the records of assignments in this office; and that the said Letters Patent should be read with this correction therein that the same may conform to the record of the case in the Patent Office.
Signed and sealed this 22nd day of February, A. D. 1927.

M. J. Moore,
Seal. Acting Commissioner of Patents.